United States Patent Office 3,557,432
Patented Jan. 26, 1971

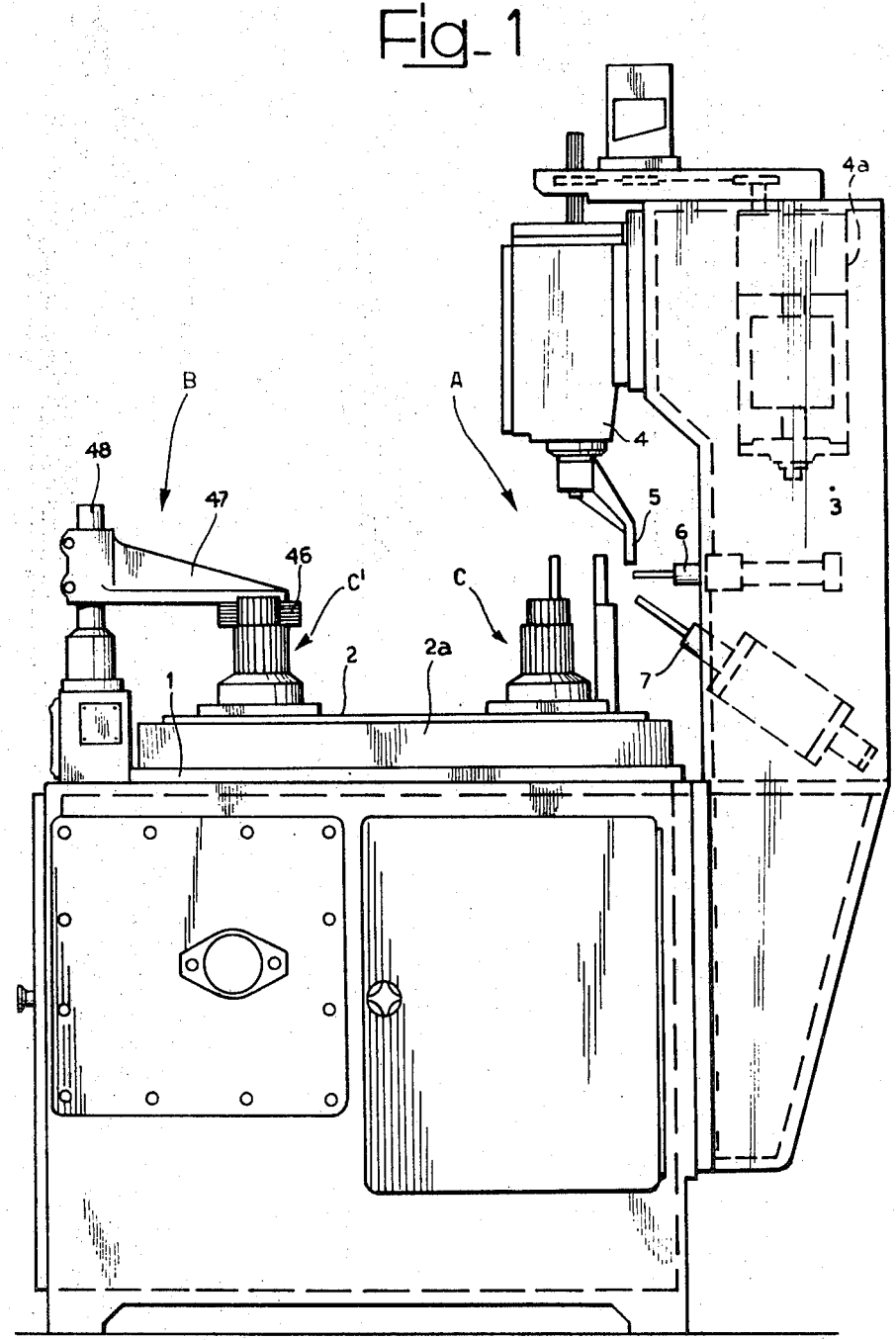
Fig_1

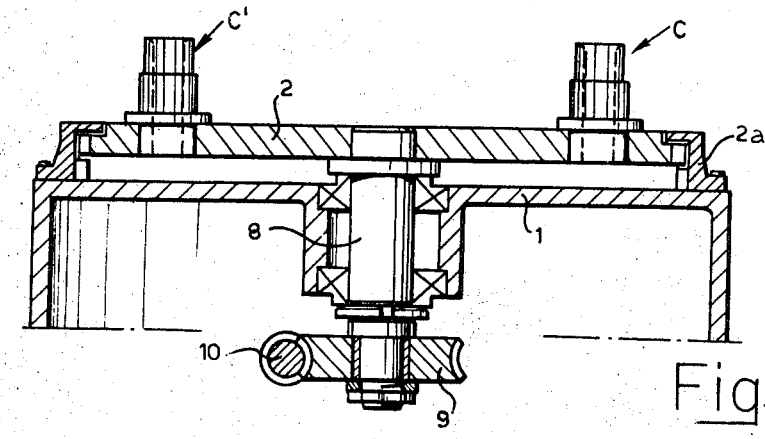
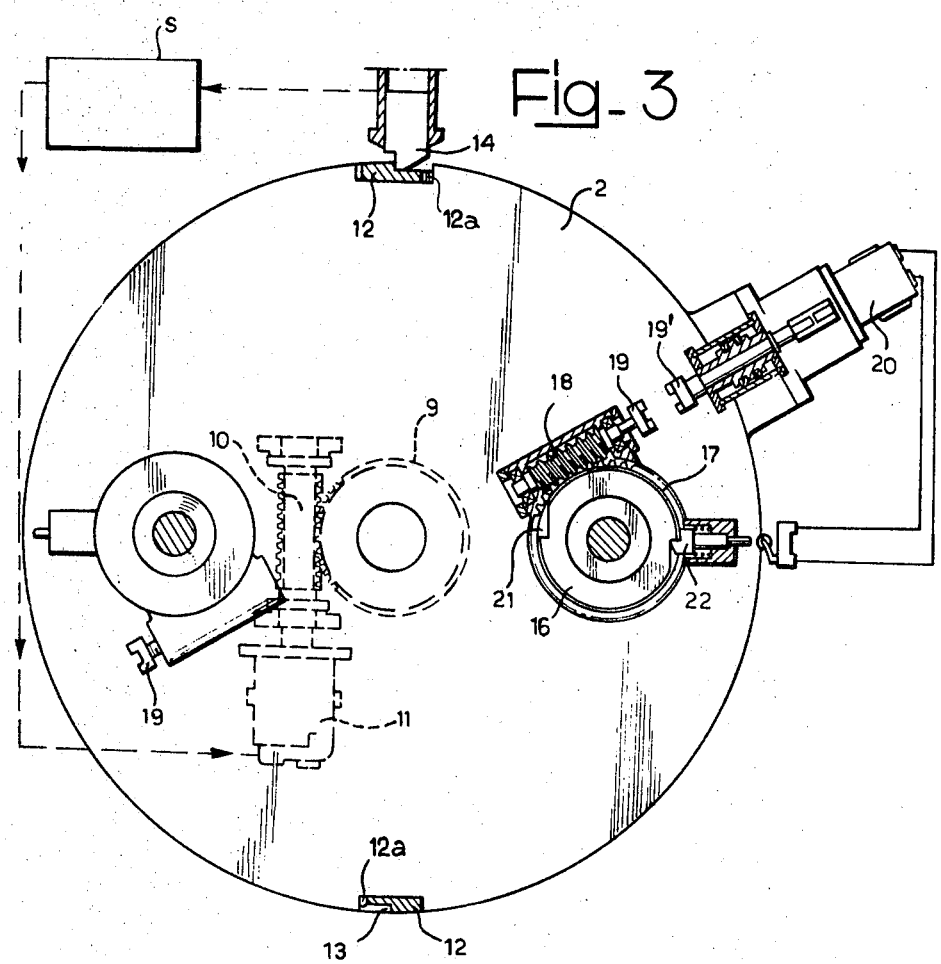

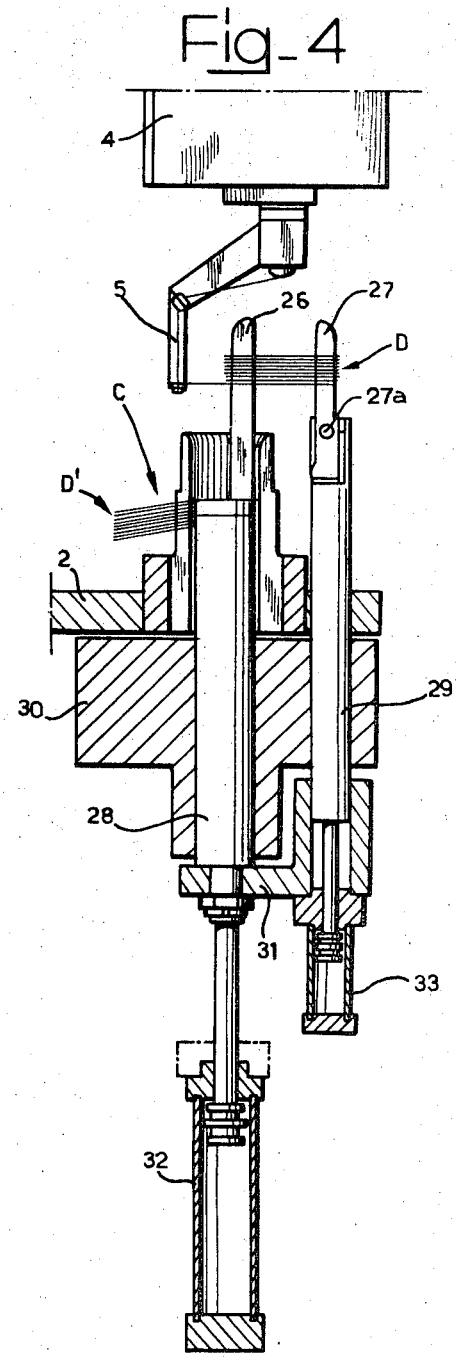

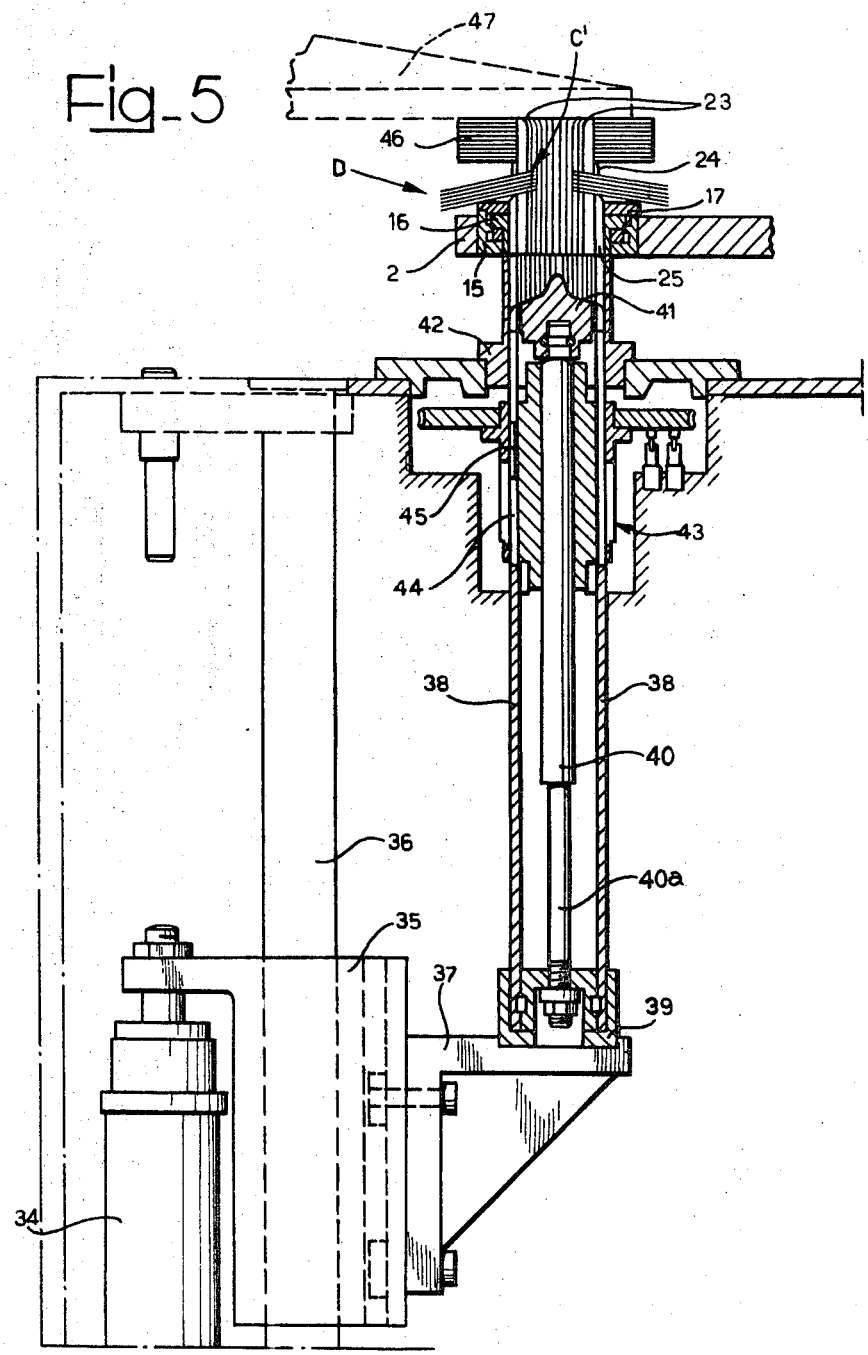

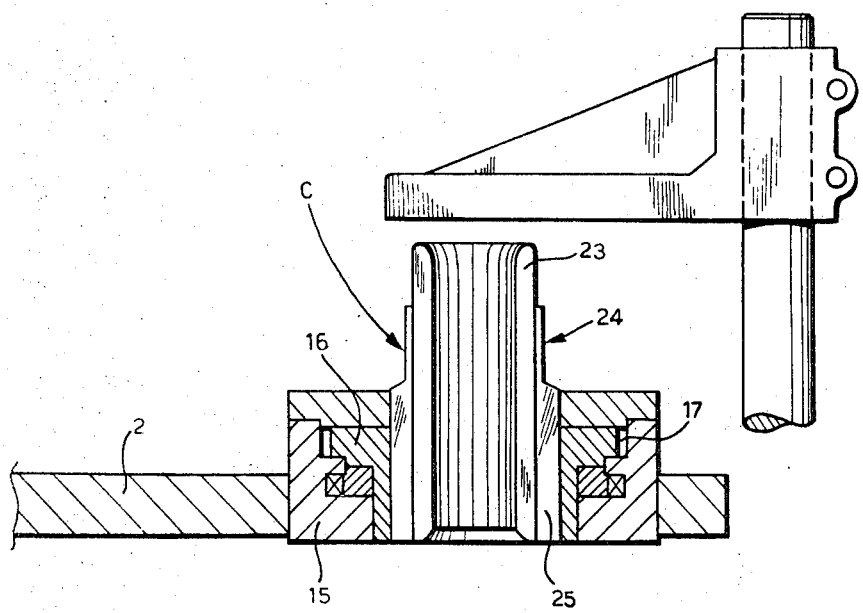

3,557,432
APPARATUS FOR FORMING WOUND STATORS FOR ELECTRIC MOTORS
Alberto Pavesi, Turin, Italy, assignor to Officine Meccaniche Pavesi & C. S.p.A., Cascine Vica, Torino, Italy, an Italian joint-stock company
Filed May 31, 1968, Ser. No. 733,537
Claims priority, application Italy, June 12, 1967, 807,792/67
Int. Cl. H02k 15/00
U.S. Cl. 29—205                    13 Claims

ABSTRACT OF THE DISCLOSURE

Coils for an electric motor stator are wound on an inserting device which is then carried on a rotary platform to an inserting station, where the coils are transferred from said device to the slots of a stator. Both the winding and inserting operations are carried out on different inserting devices concurrently.

---

This invention relates to a method and apparatus for forming wound stators for electric motors.

It is known that the stators of electric motors are assembled by winding, generally on separate formers, coils of insulated wire and subsequently inserting the coils into respective slots in the stators.

The coils, of a pre-determined shape, are normally prepared on winding machines adapted to wind the coils on rotary or stationary formers utilising in the latter case hoop winding heads. The coils are then inserted into the slots in the stators by means of separate inserting machines which simultaneously insert lining elements or protective tiles into the slots.

In order to effect the above sequence of operations the previously-prepared coils should be transferred to the inserting machine either manually or by means of special transfer devices. In either case the full sequence of operations entails a considerable loss of time and increases the possibility of wastage through damage to the coils during transfer.

An object of the present invention is to avoid the above drawbacks by providing an apparatus which simplifies and facilitates preparation of the coils and insertion thereof into the stator slots, reducing the overall time taken by the sequence of operations and dispensing with the need to transfer the coils between separate machines, so as to reduce the possibility of damage and, therefore, the percentage of wastage of the finished stators.

A further object of the invention is to provide an apparatus of the abovementioned type by which the complete sequence of operations can be rendered automatic.

The present invention accordingly provides a method of forming wound stators for electric motors comprising the steps of forming coils on an inserting device disposed at a winding station, displacing the loaded inserting device to an inserting station and transferring the coils, together with respective lining elements, into respective slots of a stator releasably held at the inserting station, the forming of coils on one said inserting device being effected concurrently with the transfer of coils to a said stator from another said inserting device.

Apparatus according to the invention is characterised by a platform rotatable about a vertical axis, at least two inserting devices mounted on the platform and movable successively upon rotation of the platform from a winding station to an inserting station, coil forming means at the winding station for winding respective coils and placing them in respective positions on a said inserting device disposed at the winding station, releasable clamp means for releasably locking a stator relatively to a said inserting device at the inserting station, means for positioning stator slot lining elements at the inserting station for insertion in respective slots of the said stator, and transfer means for engaging the formed coils on a loaded inserting device at the inserting station and transferring said coils, together with the respective lining elements, into the respective slots of the stator.

The apparaus according to the invention is highly flexible in use and may be adapted readily for manufacturing different types of stators having different numbers of coils.

The invention will be more clearly understood from the following description, given by way of example only, with reference to the accompanying drawings, in which:

FIG. 1 is a diagrammatic side elevational view of apparatus for use in forming wound stators for electric motors according to one embodiment of the invention;

FIG. 2 is a diagrammatic cross-sectional view in a vertical plane of the lower portion of the apparatus of FIG. 1;

FIG. 3 is a plan view of the rotatable platform of said apparatus;

FIG. 4 is a diagrammatic part-sectional elevation of the winding station of said apparatus;

FIG. 5 is a diagrammatic part-sectional elevation of the inserting station of said apparatus; and FIG. 6 is a cross-sectional view in a vertical plane of one of the inserting appliances with which the said apparatus is equipped.

Referring to FIG. 1, the apparatus has a fixed bedplate 1 on which a horizontal circular platform 2 is supported for rotation about its axis, the outer edge of the platform 2 being protected by an annular upstanding rim 2a.

The rotatable platform 2 supports a number of inserting devices, in this case, two inserting devices C, C' arranged at diametrically opposite positions. The inserting devices C, C' are transferred successively from a winding station A at which coils for forming respective stator windings are wound to an inserting station B at which the coils are inserted into a stator by rotation of the platform 2.

An upright 3 fixed relative to the bedplate 1 is arranged at the winding station A and supports a winding head 4 of known construction provided with a rotary hoop 5, a wire clamping device 6 and a wire cutting device 7. Control means, indicated in broken outline at 4a, are housed in the upright 3 and control the number of turns as well as the pitch of the turns on each coil wound by the head 4, in accordance with a pre-determined programme.

The rotatable platform 2 is provided with a central shaft 8 arranged with its axis vertical (FIGS. 2, 3) and having keyed thereto a worm wheel 9 cooperating with a horizontal worm 10. The worm 10 is driven by a motor 11 which rotates the platform 2, the motor 11 being housed beneath the bedplate 1.

A plurality of shaped inserts 12 are arranged around the circumferential edge of the platform 2 and are formed with notches 13 adapted to be engaged by a locking tooth 14 on the bedplate 1 to position the platform 2 accurately with respect to the winding and inserting stations A, B, respectively. The number of inserts 12 is equal in number to the number of stations associated with the operational cycle, which may be greater than two. Accuracy of location of the platform 2 is ensured by adjustment of the position of each insert 12, for example by inserting shims 12a of predetermined thickness behind the insert.

An electropneumatic safety device, shown diagrammatically at S in FIGURE 3, is responsive to the position of the lock tooth 14 to stop the operation of the apparatus if the respective notch 13 fails to engage accurately with the lock tooth 14.

As shown in FIGURES 3 to 6, the inserting devices C, C' each comprise a stationary bushing 15 carried by the rotatable platform 2 and supporting a rotary ring 16 within the bushing 15. The ring 16 is connected to a worm wheel 17 which meshes with a worm 18 (FIGURE 3) which may be rotated through a dog clutch 19, 19' by a motor 20.

The ring 16 is formed with notches 21 in its outer periphery and a movable locking tooth 22 is spring-urged into locking engagement with said notches 21. The tooth 22 is operatively associated with a movable contact 22a of an electrical switch which controls the ring 16 when the tooth 22 engages in a notch 21.

The rotary ring 16 is provided with a plurality of vertical fingers 23 arranged in a circular row around the bore in the ring 16 and spaced from one another circumferentially by respective grooves 25. Each finger 23 is formed with an upwardly projecting element 24.

Means for forming the respective coils are provided at the winding station A beneath the rotary platform 2, FIGURE 4. Said means comprise inner and outer parallel rods 26, 27 fixed to vertically movable standards 28, 29 respectively and guided in a stationary block 30. One pair of said rods 26, 27 only is shown in FIG. 4. The rods 26, 27 are interconnected by a strap 31 which is operatively connected to a fluid pressure actuator 32. More than one outer rod 27 may be provided in association with a single inner rod 26.

The standard 28 extends coaxially within the respective inserting device C which is positioned at the winding station; a separate standard 29 is provided for each rod 27, each standard 29 being arranged externally of said inserting device C.

The external rods 27 are provided with respective actuators 33 for effecting angular movement of the rods 27 about respective pivots 27a relative to their respective standards 29 to permit release of the coil D after winding on said rods 26, 27.

A driving unit is arranged beneath the rotary platform 2 at the inserting station B and comprises a fluid pressure telescopic jack 34 (FIG. 5) operatively connected to a carriage 35 movable along a vertical guide 36 and carrying a strap 37 to which a plurality of vertically extending needles 38 arranged in a circular row are attached by means of a bushing 39. The bushing 39 is slidable along a reduced diameter portion 40a of a vertically movable rod 40 having secured to its upper end a push member 41. The push member 41 has an upper surface which slopes symmetrically downwardly from a central raised part and which is referred to herein as a mushroom surface. The rod 40 is engaged and moved upwardly by the bushing 39 after an inital part stroke of the bushing 39 during which the needles 38 alone are moved.

The push member 41 is guided in a tubular guide sleeve 42 secured to the bedplate 1 of the machine and formed internally with vertical circumferentially spaced apart grooves along which corresponding radially outwardly extending projections on the member 41 slide for introducing the coils into the slots of a stator as hereinafter described.

The needles 38 are aligned with and adapted to slide along respective longitudinal grooves 44 cut in a false stator member 43, which co-operates with a known unit (not shown) for preparing insulating lining elements 45 for introduction into the grooves 44 in the member 43. The grooves 44 correspond in respect of size and spacing to the stator slots.

The insulating elements 45 are of V or tile shape and are formed of paper or other insulating material adapted to protect the coils when introduced into the stator slots.

The false stator 43 is arranged coaxially beneath the guide sleeve 42 for the push member 41, with the grooves of the sleeve 42 aligned with the grooves 44 of the false stator 43.

A laminated stator 46 is fitted over the upper ends of the fingers 23 of the respective loaded inserting device C' at the inserting station B and is clamped to the said device by means of at least two vertically movable jaws 47 carried on rotatable vertical shafts 48, one only of which is shown in FIGURE 1, the jaws 47 engaging the upper face of the stator 46 on opposite sides of the bore therein.

The apparatus described above operates as follows: assuming the rotary platform 2 to be at the beginning of a cycle with the inserting device C empty and disposed at the winding station A. At the start the rods 26, 27 are raised, the winding head 4 being driven in slow motion, then at a faster speed. Thus a first coil D is wound on the upper ends of the said rods 26, 27 the coil D having a predetermined number of turns and a predetermined inter-turn pitch. Upon completion of the first coil D further outer rods 26, 27 are raised in turn for the winding of further coils, the winding cycle being repeated until all the coils D for a given pole phase of the stator have been wound. The wound coils are then placed in a proper position on the fingers 23 of the inserting device C by a downward movement of the strap 31, caused by the actuator 32.

After winding a first pole phase, further pole-phases, are wound on the device C. For this purpose, the actuator 32 lowers all the rods 26, 27 and the inserting device C is rotated, for example, through 180°, to permit the subsequent winding of further coils for a further stator pole-phase. Such rotation is effected by means of the motor 20.

While these operations are being effected on the inserting device C' is disposed at the inserting station B and carries the requisite coils D formed in the preceding winding sequence. The grooves 44 in the false stator 43 are provided with the requisite number of lining elements 45, while the operator, or alternatively, an automatic charger inserts a stator 46 over the upper ends of the inserting device C', to which the stator 46 is clamped by the jaws 47, the slots of the stator 46 being aligned with the grooves 44.

Subsequently, the jack 34 is operated and raises at first only the needles 38, and then the push member 41 to transfer to the slots in the stator 41 both the lining elements 45 and the coils D previously prepared and arranged on the fingers 23 of the said device C'.

As soon as the needles 38 and the push member 41 have performed their return stroke the clamping jaws 47 are moved apart and the stator is then removed from the inserting device C'.

When the longer of the two series of operations carried out concurrently at the two stations A, B of the apparatus is completed, the platform 2 is automatically rotated by the motor 11 through 180° to bring the now empty inserting device C' to the winding station A and the loaded device C to the inserting station B for the initiation of two further simultaneous cycles of operations similar to those described above.

The apparatus is of high flexibility in use, since a high number of coils with a plurality of pole-phases may be made, and two or a plurality of layers of coils may be wound and inserted simultaneously with a considerable economy in time.

The concurrent performance of the two operational cycles for winding and insertion, reduces the overall time of the operations, avoids time wastage in the transfer of the coils D on an inserting device while said device is high standard of accuracy and a low reject percentage.

To save time further, the actuator 32 may be operated to lower the rods 26, 27 on completion of the winding of the coils D on an inserting device while said device is being transferred on the platform 2 from the winding station A to the inserting station B.

What is claimed is:

1. Apparatus for use in forming wound stators for elec-
   (i) a platform rotatable about a vertical axis;
   (ii) fixed winding and inserting stations arranged in juxtaposition to the platform;
   (iii) at least two inserting devices mounted on the platform;
   (iv) driving means effective to rotate said platform to move respective said inserting devices from the winding station to the inserting station;
   (v) coil forming means at the winding station for winding respective coils and placing them on a said inserting device disposed at the winding station;

(vi) releasable stator clamp means for locking a slotted stator relative to a said inserting device at the inserting station;

(vii) positioning means for positioning stator slot lining elements at the inserting station for insertion in respective slots of a said stator; and (viii) transfer means effective to engage the formed coils on an inserting device at the inserting station and effective to transfer said coils, together with respective said lining elements, into respective stator slots.

2. Apparatus as claimed in claim 1, wherein each inserting device comprises an annular array of vertically extending fingers, adjacent fingers being spaced apart to define respective grooves, and wherein the coil forming means are effective to form respective coils on respective said fingers.

3. Apparatus as claimed in claim 2, wherein the coil forming means comprise an inner rod extending vertically within the annular array, at least one outer rod extending vertically externally of the array, a fixed winding head disposed at the winding station, and fluid pressure actuator means adapted to effect selectively upward and downward movement of said rods relative to said winding head.

4. Apparatus as claimed in claim 3 including at least one actuator operatively associated with said at least one outer rod relative to the inner rod to permit release of a outer rod relative to the inner rod to permit release of a respective wound coil.

5. Apparatus as claimed in claim 2, wherein the positioning means comprise a false stator at the inserting station, said false stator having grooves which are adapted to be aligned with the slots of a said stator held in the clamp means, the transfer means including a plurality of vertical needles movable vertically in unison through respective said grooves to transfer respective said lining elements into the stator slots.

6. Apparatus as claimed in claim 2, wherein the transfer means include a push member which is movable vertically through and coaxially with the array of fingers of a said inserting device at the inserting station to transfer respective coils from said fingers into respective slots of a said stator held in the clamp means.

7. Apparatus as claimed in claim 6, in which the push member has an upper surface which slopes symmetrically downwardly from a central uppermost point.

8. Apparatus as claimed in claim 5, including common fluid pressure actuator means operatively connected to said needles and to said push member to effect vertical movement thereof.

9. Apparatus as claimed in claim 8, including a lost-motion connection between the push member and said actuator, whereby the push member is moved vertically after the needles have been moved vertically to transfer the lining elements to the stator slots.

10. Apparatus as claimed in claim 1, wherein the driving means comprise a central shaft attached to the platform, a motor mounted beneath the platform, and a worm reduction gear interconnecting the motor and the shaft.

11. Apparatus as claimed in claim 1, including locking means effective to retain the platform in each position thereof at which respective said inserting devices are disposed at the winding and inserting stations.

12. Apparatus as claimed in claim 11 including a safety device operatively associated with the locking means and effective to stop operation of the apparatus upon failure of the locking means to engage the platform at a said position.

13. Apparatus as claimed in claim 1, wherein the stator clamp means comprise at least one clamp member, and at least one vertical shaft rotatable about its axis and supporting said clamp member, said clamp member being adapted to engage the upper end of a said stator one lateral side of the slotted bore of the stator.

References Cited

UNITED STATES PATENTS

| | | | |
|---|---|---|---|
| 3,324,536 | 6/1967 | Hill | 29—205 |
| 3,415,292 | 12/1968 | Ericson | 29—205X |
| 3,447,225 | 6/1969 | Eminger | 29—205 |
| 3,481,372 | 12/1969 | Eminger et al. | 29—596X |

JOHN F. CAMPBELL, Primary Examiner.

CARL E. HALL, Assistant Examiner.

U.S. Cl. X.R.

29—596, 605, 606; 140—92.2; 242—7.09